United States Patent
Lee

(10) Patent No.: US 9,645,925 B2
(45) Date of Patent: May 9, 2017

(54) NON-VOLATILE MEMORY SYSTEM, MOBILE APPARATUS INCLUDING THE SAME, AND METHOD OF OPERATING THE NON-VOLATILE MEMORY SYSTEM

(71) Applicant: Samsung Electronics Co., Ltd., Suwon-si (KR)

(72) Inventor: Byung-yo Lee, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 44 days.

(21) Appl. No.: 14/555,544

(22) Filed: Nov. 26, 2014

(65) Prior Publication Data

US 2015/0169443 A1  Jun. 18, 2015

(30) Foreign Application Priority Data

Dec. 12, 2013  (KR) ........................ 10-2013-0154776

(51) Int. Cl.
*G06F 12/00* (2006.01)
*G06F 12/02* (2006.01)

(52) U.S. Cl.
CPC ...... *G06F 12/0253* (2013.01); *G06F 12/0246* (2013.01); *G06F 2212/7201* (2013.01); *G06F 2212/7205* (2013.01); *Y02B 60/1225* (2013.01)

(58) Field of Classification Search
CPC ............. G06F 12/0253; G06F 12/0246; G06F 2212/7205; G06F 2212/7201; Y02B 60/1225
See application file for complete search history.

(56) References Cited

U.S. PATENT DOCUMENTS

| | | | |
|---|---|---|---|
| 6,065,020 A | 5/2000 | Dussud | |
| 7,392,269 B2 | 6/2008 | Chauvel | |
| 8,010,742 B2 | 8/2011 | Molaro et al. | |
| 8,214,583 B2 | 7/2012 | Sinclair et al. | |
| 8,234,378 B2 | 7/2012 | Stephens et al. | |
| 8,261,358 B2 | 9/2012 | Little et al. | |
| 8,291,151 B2 | 10/2012 | Sinclair | |
| 8,292,177 B2 | 10/2012 | Elhamias et al. | |
| 8,364,918 B1 | 1/2013 | Smith et al. | |
| 2005/0268132 A1 | 12/2005 | Yun et al. | |

(Continued)

FOREIGN PATENT DOCUMENTS

KR  2013-0051032  5/2013

OTHER PUBLICATIONS

Birrell, et al. "Distributed Garbage Collection for Network Objects." Dec. 15, 1993.

*Primary Examiner* — Larry Mackall
(74) *Attorney, Agent, or Firm* — Muir Patent Law, PLLC

(57) ABSTRACT

A method of controlling a non-volatile memory system including a non-volatile memory device having a non-volatile memory cell array is disclosed. The method includes: determining environment information corresponding to a communication speed relating to a transmission medium to which the non-volatile memory device is connected; selecting a management operation mode based on the determined environment information; and performing a memory managing operation on the non-volatile memory device using the selected management operation mode during an idle time of the non-volatile memory device.

20 Claims, 14 Drawing Sheets

(56) References Cited

U.S. PATENT DOCUMENTS

| | | |
|---|---|---|
| 2008/0250202 A1 | 10/2008 | Conley et al. |
| 2009/0006719 A1 | 1/2009 | Traister |
| 2009/0319720 A1* | 12/2009 | Stefanus ............. G06F 12/0246 711/103 |
| 2012/0140651 A1 | 6/2012 | Nicoara et al. |
| 2012/0173795 A1 | 7/2012 | Schuette et al. |
| 2013/0178999 A1 | 7/2013 | Geissler et al. |
| 2013/0185487 A1 | 7/2013 | Kim et al. |
| 2013/0219057 A1 | 8/2013 | Li et al. |

* cited by examiner

| Flag | PD | GC |
|------|--------|--------|
| 0 | Lev_pd0 | Lev_gc0 |
| 1 | Lev_pd1 | Lev_gc1 |
| ⋮ | ⋮ | ⋮ |
| n | Lev_pdn | Lev_gcn |

NON-VOLATILE MEMORY SYSTEM, MOBILE APPARATUS INCLUDING THE SAME, AND METHOD OF OPERATING THE NON-VOLATILE MEMORY SYSTEM

CROSS-REFERENCE TO RELATED APPLICATIONS

This application claims the benefit of Korean Patent Application No. 10-2013-0154776, filed on Dec. 12, 2013, in the Korean Intellectual Property Office, the disclosure of which is incorporated herein in its entirety by reference.

BACKGROUND

The present disclosure relates to a non-volatile memory system and a mobile apparatus including the non-volatile memory system, and more particularly, to a non-volatile memory system that performs a memory managing operation during an idle time, a mobile apparatus including the non-volatile memory system, and a method of operating the non-volatile memory system.

Among data storage devices, a non-volatile memory device retains stored data even when power is not provided to the device. A non-volatile memory device includes, for example, a read-only memory (ROM), a magnetic disc, an optical disc, a flash memory, etc. The flash memory is a type of memory that stores data according to a change in a threshold voltage of a metal-oxide-semiconductor (MOS) transistor. Flash memory includes a NAND flash memory and a NOR flash memory.

Due to features of the non-volatile memory system, constant use of the non-volatile memory system leads to fragmentation. In order to secure free (memory) blocks, an operation such as garbage collection is performed on fragmented memory systems. Such operations can lead to deterioration in the performance of the non-volatile memory system. In a case of a mobile apparatus (e.g., a smart phone, a tablet computer, etc.) that uses the non-volatile memory system, an idle time exists during which an actual memory is not accessed. There is a demand for efficient management of the non-volatile memory system during the idle time.

SUMMARY

The present disclosure provides a non-volatile memory system, a mobile apparatus including the non-volatile memory system, and a method of operating the non-volatile memory system, wherein the deterioration of the non-volatile memory system of a mobile apparatus may be prevented.

In one embodiment, a method of controlling a non-volatile memory system including a non-volatile memory device having a non-volatile memory cell array is disclosed. The method includes: determining environment information corresponding to a communication speed relating to a transmission medium to which the non-volatile memory device is connected; selecting a management operation mode based on the determined environment information; and performing a memory managing operation on the non-volatile memory device using the selected management operation mode during an idle time of the non-volatile memory device.

In one embodiment, the memory managing operation comprises a garbage collection operation for generating a free block.

In certain embodiments the environment information corresponds to a communication speed of a network to which a mobile apparatus including the non-volatile memory device is connected.

In one embodiment, the method additionally includes selecting the management operation mode based on mode information indicating the management operation mode; wherein the memory managing operation comprises a garbage collection operation for generating one or more free blocks, and a number of free blocks to be secured by the garbage collection operation during the idle time is determined based on the mode information.

In one embodiment, the mode information is stored in a register set, and a power saving mode of the non-volatile memory system is controlled according to the mode information.

The method may additionally include, when the network to which a mobile apparatus including the non-volatile memory device is connected is changed, changing the mode information that is set in the register set to correspond to environment information corresponding to the changed network.

In one embodiment, the method additionally includes determining whether the non-volatile memory device includes a dirty status; when the non-volatile memory device includes a dirty status, performing garbage collection during idle time of the non-volatile memory device, the garbage collection being performed using the selected management operation mode; and when the non-volatile memory device does not include a dirty status, performing a power management operation during idle time of the non-volatile memory device, the power management operation selected using the selected management operation mode.

In one embodiment, the determining, selecting, and performing, are all carried out by a mobile device that includes the non-volatile memory device.

The management operation mode may be one of memory management operation mode and a power management operation mode.

In another aspect of the disclosed embodiments, a method of operating a non-volatile memory system includes: receiving environment information related to a surrounding infrastructure of a mobile apparatus comprising the non-volatile memory system; setting mode information in a register set, based on the environment information; and during an idle time of the non-volatile memory system, performing a memory managing operation on a non-volatile memory device included in the non-volatile memory system according to the mode information set in the register set.

The memory managing operation may include: a garbage collection operation for generating one or more free blocks, wherein a number of free blocks to be secured by the garbage collection operation during the idle time is set according to the mode information.

In one embodiment, when the environment information causes the idle time to be over a threshold amount, the number of free blocks to be secured by the garbage collection operation during the idle time is set to a first amount, and when the environment information causes the idle time to be under the threshold amount, the number of free blocks to be secured by the garbage collection operation during the idle time is set to a second amount smaller than the first amount.

In one embodiment, the method further includes changing the mode information that is set in the register set based on a change in the environment related to the surrounding infrastructure.

The method may additionally include selectively performing at least one of a standby mode and a deep power down mode during the idle time based on the mode information.

In one embodiment, the method further includes: determining whether the non-volatile memory system includes a dirty status; when the non-volatile memory device includes a dirty status, performing garbage collection during idle time of the non-volatile memory device, the garbage collection being performed using a management operation mode selected based on the mode information; and when the non-volatile memory device does not include a dirty status, performing a power management operation during idle time of the non-volatile memory device, the power management operation performed using a management operation mode selected based on the mode information.

In one embodiment, the receiving, setting, and performing, are all carried out by a mobile device that includes the non-volatile memory device.

In another aspect of the disclosed embodiments, a mobile terminal includes: a non-volatile memory system having a memory controller; and a host connected to the non-volatile memory system and to a communication network, wherein the host communicates environment information of the communication network to the non-volatile memory system and the memory controller sets mode information based on the environment information and performs a memory managing operation during an idle time of the non-volatile memory system. A mode of the memory managing operation is selected based on the mode information.

The communication network may be one of a 3G network, a 4G network, a Wi-Fi network and a local area network (LAN).

In one embodiment, the memory managing operation includes a garbage collection operation. In addition, the mode information may include a number of free blocks to be secured by the garbage collection operation during the idle time.

BRIEF DESCRIPTION OF THE DRAWINGS

Exemplary embodiments of the inventive concept will be more clearly understood from the following detailed description taken in conjunction with the accompanying drawings in which:

FIGS. 5A and 5B illustrate examples of a maximum bandwidth and a valid bandwidth of a surrounding infrastructure including a communication network, a universal serial bus (USB), or the like;

DETAILED DESCRIPTION OF THE EMBODIMENTS

Figure 1:
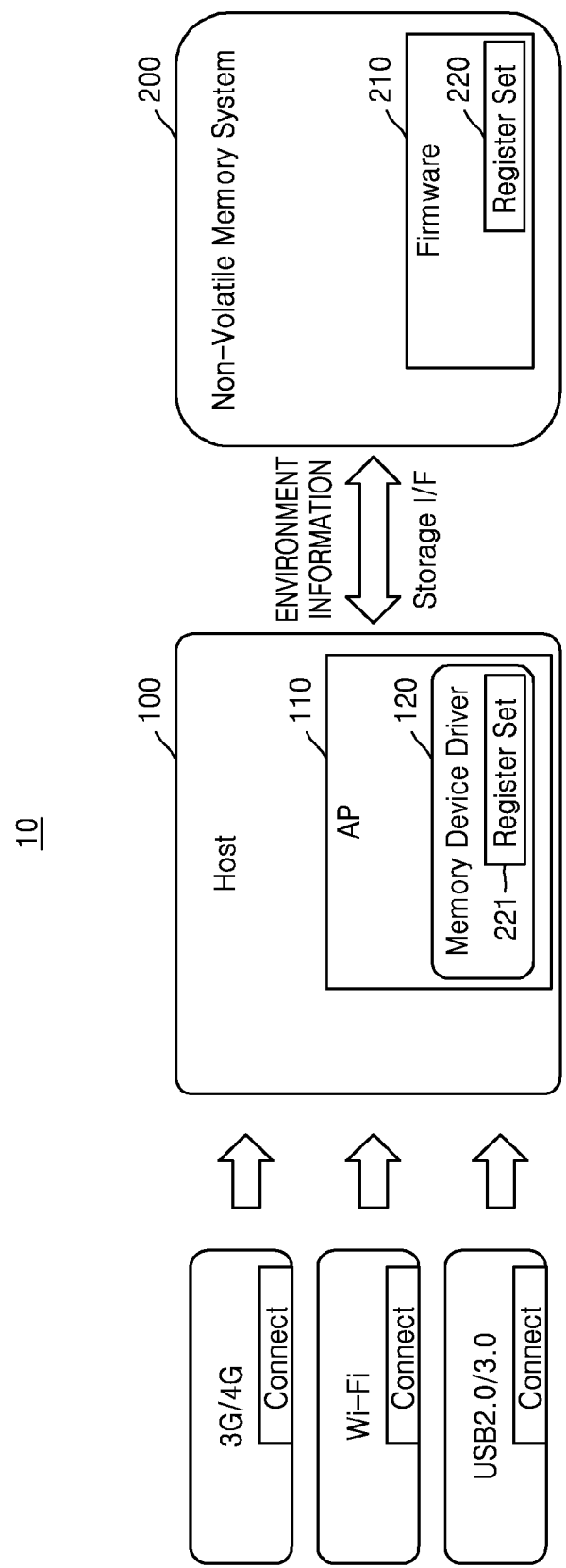
FIG. 1 is a block diagram of a system including a non-volatile memory system and a host that communicates with the non-volatile memory system, according to an embodiment of the inventive concept.

The present disclosure will now be described more fully with reference to the accompanying drawings, in which exemplary embodiments of the invention are shown. The invention may, however, be embodied in many different forms, and should not be construed as being limited to the embodiments set forth herein. Like reference numerals in the drawings denote like elements. In the drawings, the dimension of structures may be exaggerated for clarity.

Furthermore, all examples and conditional language recited herein are to be construed as being without limitation to such specifically recited examples and conditions. Throughout the specification, a singular form may include plural forms, unless there is a particular description contrary thereto. Also, terms such as "include," "including," "comprise," or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

It will be understood that, although the terms first, second, etc. may be used herein to describe various elements, these elements should not be limited by these terms. Unless indicated otherwise, these terms are only used to distinguish one element from another, for example as a naming convention. For example, a first chip could be termed a second chip, and, similarly, a second chip could be termed a first chip without departing from the teachings of the disclosure.

Unless the context indicates otherwise, terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

As used herein, the term "and/or" includes any and all combinations of one or more of the associated listed items.

FIG. 1 is a block diagram of a system including a non-volatile memory system 200 and a host 100 that communicates with the non-volatile memory system 200, according to an embodiment of the inventive concept. Host 100 and a storage system (such as non-volatile memory system 200) may be implemented in various systems. The various systems may correspond to various devices including, for example, a mobile apparatus such as a smart phone, a tablet computer, etc. Hereinafter, it is assumed that the system of FIG. 1 is a mobile apparatus 10. Also, the storage system may include a non-volatile memory device such as read-only memory (ROM), a magnetic disc, an optical disc, a flash memory, etc. A flash memory stores data according to a change in a threshold voltage of a metal-oxide-semiconductor (MOS) transistor, and includes a NAND flash memory and a NOR flash memory. The storage system may correspond to a memory card such as an embedded MultiMediaCard (eMMC), a Secure Digital (SD) card, a Micro SD card, etc. that includes the non-volatile memory system 200. Hereinafter, while a configuration and operations of the storage system are described, it is assumed that the storage system is the non-volatile memory system 200.

Due to features of the non-volatile memory system 200, constant use of the non-volatile memory system 200 leads to fragmentation. In order to secure free blocks, an operation such as garbage collection or the like is performed on fragmented memory systems. In addition, a memory managing operation such as wear leveling may be performed. For example, regardless of an access to an actual memory, a software or hardware managing operation may be used for a normal memory operation causing deterioration in the system performance. Due to a system bottleneck, an idle time, in which the actual storage system does not operate, exists in the mobile apparatus 10. By performing an operation such as garbage collection or wear leveling on the non-volatile memory system 200 during the idle time, a latency associated with the memory managing operation may be hidden and deterioration of the system performance may be avoided. Since the idle time may be actually maintained for a long time, power consumption of the mobile apparatus 10 may be efficiently reduced by using various ways including a sleep mode, a frequency down, etc.

As illustrated in FIG. 1, the mobile apparatus 10 may be connected to various communication networks or may perform communication with an external apparatus such as a universal serial bus (USB), etc. The various communication networks may include a third generation (3G) network, a fourth generation (4G) network, Wi-Fi, etc. The mobile apparatus 10 may also be connected to another communication network (e.g., a short distance communication network such as a local area network (LAN)), or may be connected to a communication apparatus other than the USB.

The host 100 may include an application processor AP 110. For example, the application processor AP 110 may be a processor in a mobile platform and for example, the application processor AP 110 may be embodied in the form of a system on chip (SoC) on one chip. The host 100 may be connected to a communication network or a USB environment, which corresponds to a surrounding infrastructure. When the host 100 is connected to the surrounding infrastructure, the host 100 may obtain information about the communication network or the USB environment. The application processor AP 110 may include a memory device driver 120 for controlling an operation of the non-volatile memory system 200. The memory device driver 120 may include a register set 121 for storing information that can be utilized to control the non-volatile memory system 200.

The non-volatile memory system 200 may include firmware 210. The firmware 210 may be included as software in a memory controller (not shown) of the non-volatile memory system 200, and in a case where the non-volatile memory system 200 is a flash memory device, the firmware 210 may include a flash translation layer (FTL). The firmware 210 may perform not only the aforementioned memory managing operation such as the garbage collection, the wear leveling, etc. but may also perform translation between a logical address from the host 100 and a physical address that is an actual location in a flash memory cell. Also, the firmware 210 may include a register set 220 for storing information related to the memory managing operation.

The mobile apparatus 10 may be connected to an external source, for example, by using one of two methods that are broadly classified. First, the mobile apparatus 10 may use a network such as 3G, 4G, etc. of a communication company, or may download or upload content by using Wi-Fi via a wireless router. Second, the mobile apparatus 10 may be connected to a personal computer (PC) including a desktop, a notebook, etc. via an interface such as a USB and thus may download or upload content.

When the mobile apparatus 10 is connected to the surrounding infrastructure, the mobile apparatus 10 may recognize environment information about a corresponding communication network or USB, and information having a value according to the recognized environment information may be stored in the register set of the host 100 and/or the register set 220 of the non-volatile memory system 200. For example, the host 100 may store information (hereinafter, mode information) having different values corresponding to the recognized environment information in the register set, and may provide a flag having a value corresponding to the recognized environment information to the non-volatile memory system 200. The non-volatile memory system 200 may store the mode information (having different values according to each flag) in the register set 220. The mode information may indicate a management operation mode for the non-volatile memory system 200. For example, the mode information may indicate how a memory managing operation should be performed according to the recognized environment information (e.g., a memory management operation mode). As a specific example, the mode information may indicate a garbage collection mode, such as how many blocks should be cleaned in each garbage collection process. As will be described further below, the mode information may also indicate at which level a power consumption management operation should be performed during the idle time according to the recognized environment information (e.g., a power management operation mode, wherein the level may refer to an amount of power down).

During the idle time of the host 100 (here, the idle time of the host 100 may be defined as a memory idle time that corresponds to a memory non-access period of the non-volatile memory system 200), the memory managing operation and the power consumption management operation may be performed according to set information (e.g., the mode information). For example, by checking a status of the non-volatile memory system 200, it is possible to check whether the non-volatile memory system 200 is in a dirty status that may need garbage collection for the non-volatile memory system 200. The garbage collection may be performed according to a check result, and the memory managing operation may be performed in one of a plurality of ways that are preset according to pre-set modes, based on the mode information. For example, a time that may be needed to perform a garbage collection operation may vary according to the number of free blocks to be generated. The mode information may indicate a garbage collection mode, such as a number of free blocks to be generated during a garbage collection operation.

Figure 2:
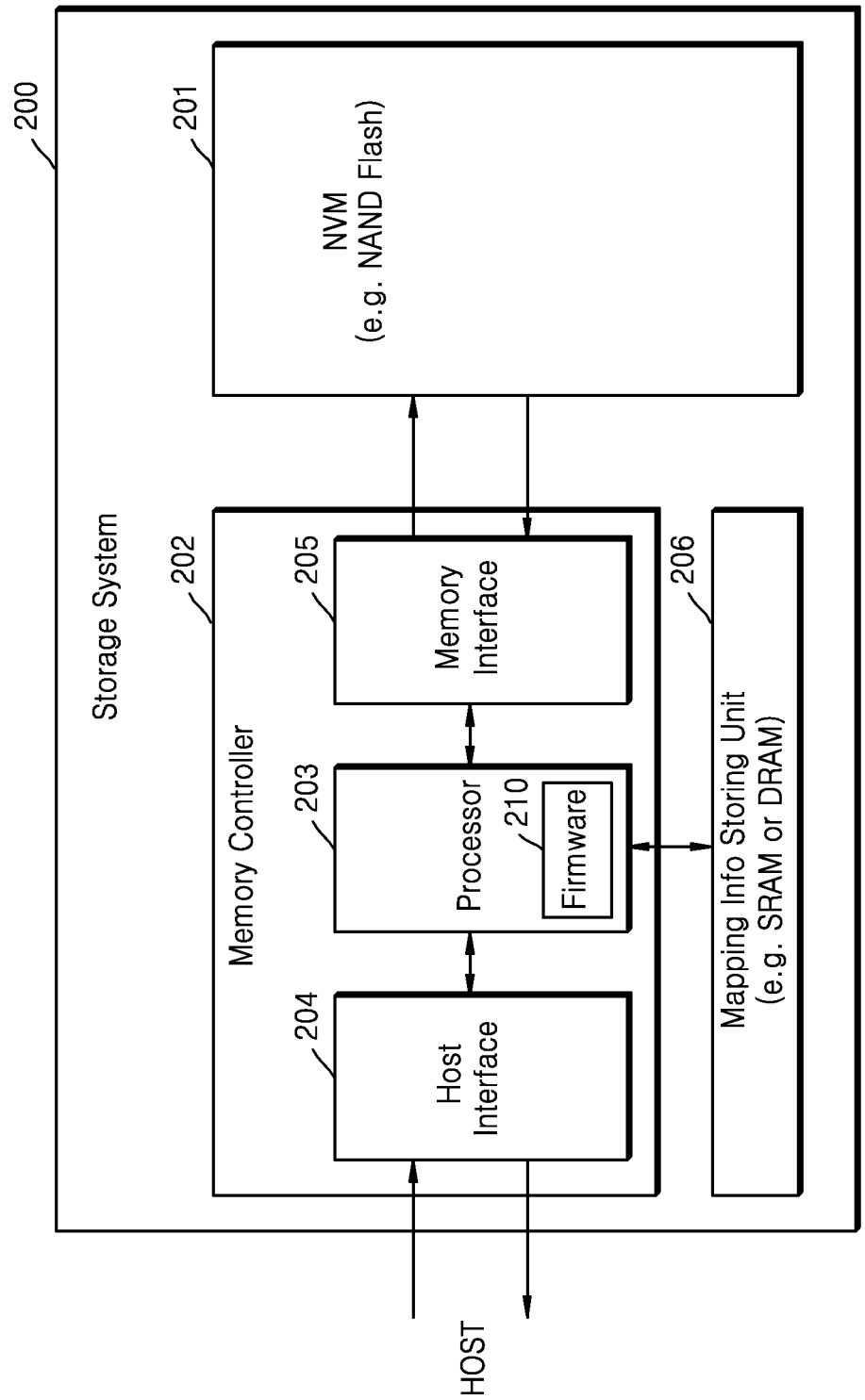
FIG. 2 is a block diagram of the non-volatile memory system of FIG. 1 according to an embodiment of the inventive concept.

FIG. 2 is a block diagram of the non-volatile memory system 200 of FIG. 1 according to an embodiment of the inventive concept.

The non-volatile memory system 200 may include a memory controller 202, a non-volatile memory 201, and a mapping info storing unit 206. A host may communicate with the non-volatile memory system 200 and thus may write data to the non-volatile memory system 200 or may read data from the non-volatile memory system 200. The data that is written or read by the host may be defined as user data.

The non-volatile memory 201 may store the user data and may further store Logical-to-Physical (L2P) Address Mapping Information (or L2P mapping information, hereinafter, mapping info) with respect to the non-volatile memory system 200. A logical address is an address of the user data that is recognizable to the host. The host may write or read the user data by designating the logical address, instead of a physical address that is an address of a space of the non-volatile memory 201 in which the user data is actually stored. The memory controller 202 may receive, from the host, an access command and the logical address with respect to the user data, and may write user data to the space designated by the physical address corresponding to the logical address, or may read user data stored in the space.

The non-volatile memory 201 may have a unique characteristic due to its feature by which the non-volatile memory 201 preserves stored data even if a power is not supplied. For example, an NAND flash memory that is an embodiment of the non-volatile memory 201 may program and read data in a unit of a page, whereas the NAND flash memory may erase data in a unit of a block including a plurality of pages. Thus, in a case where the host attempts to change user data stored in a space of the NAND flash memory which is designated by an address, the host may erase a block that stores the user data and then may program changed user data.

The memory controller 202 may manage mapping info indicating a relation between a logical address and a physical address with respect to one user data. For example, the host may transmit the logical address with respect to the one user data to the non-volatile memory system 200, and the memory controller 202 of the non-volatile memory system 200 may extract the physical address corresponding to the logical address according to the mapping info, and may write or read the one user data in a space designated by the physical address and thus may respond to a command from the host. The memory controller 202 may include control circuitry and may include hardware, software, and/or firmware configured to perform the memory control actions described herein.

In order to extend a lifetime of the non-volatile memory system 200, the memory controller 202 may change the mapping info so that a specific portion of the non-volatile memory 201 may not be repeatedly programmed or erased. That is, the memory controller 202 may change a physical address corresponding to a logical address so that all cells may be almost equally programmed or erased. This operation of the memory controller 202 is referred as wear leveling. In addition, due to an operation such as garbage collection of the memory controller 202, the mapping info may be changed. Since the mapping info should be preserved even if the power supply to the host or the non-volatile memory system 200 is cut, as illustrated in FIG. 2, the mapping info and the user data may be stored together in the non-volatile memory 201. Also, the non-volatile memory system 200 may include the mapping info storing unit 206, and at least a part of the mapping info stored in the non-volatile memory system 200 may be stored in the mapping info storing unit 206 when the non-volatile memory system 200 is driven.

The non-volatile memory 201 may include cells such as the NAND or NOR flash memory, a Magnetic Random Access Memory (MRAM), a Resistance RAM (RRAM), a Ferroelectric RAM (FRAM), or a Phase Change Memory (PCM).

The memory controller 202 may receive various commands from the host, and may perform operations on the memory controller 202 in response to the commands. In order to perform these operations, the memory controller 202 may include a host interface 204, a processor 203, and a memory interface 205.

The host interface 204 may communicate with the host by using a protocol. The protocol may include, for example, an eMMC or SD protocol, serial AT attachment (SATA), Serial Attached SCSI (SAS), NVM Express (NVMe), or USB.

The memory interface 205 may transmit a control signal, a physical address, user data, etc. to the non-volatile memory 201, and may receive user data according to a command requested by the non-volatile memory 201. Also, the memory interface 205 may transmit, to the non-volatile memory 201, a control signal that corresponds to a command from the host or an operation (e.g., garbage collection) that is self-performed by the memory controller 202. The processor 203 may control the memory controller 202, and may exchange necessary signals with the host and the non-volatile memory 201 via the host interface 204 and the memory interface 205. Also, the processor 203 may write or change mapping information in the mapping info storing unit 206.

Figure 3:
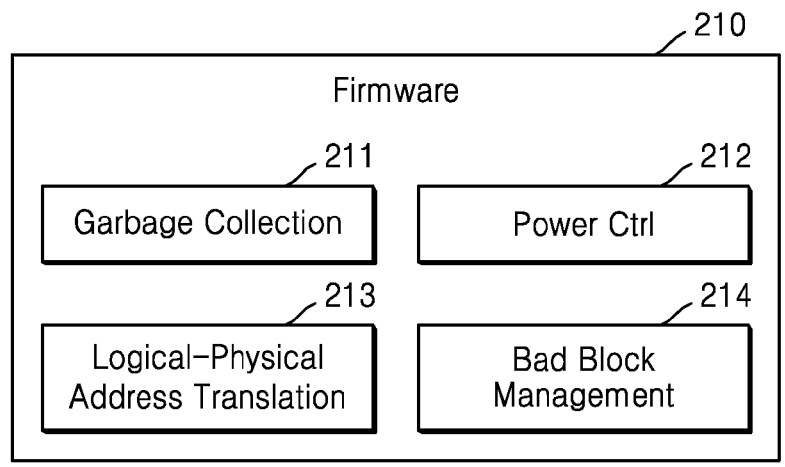
FIG. 3 is a block diagram of firmware of FIG. 2 according to an embodiment of the inventive concept.

FIG. 3 is a block diagram of firmware 210 associated with processor 203 of FIG. 2 according to an embodiment of the inventive concept. As described above, in a case where the non-volatile memory system 200 is the flash memory system, the firmware 210 may include an FTL. The firmware 210 that manages the non-volatile memory system 200 may be software embedded in the flash memory system. The firmware 210 may include, for example, a function block 211 for performing the garbage collection, a function block 212 for performing a power consumption management operation, a function block 213 for performing an operation related to logical-physical address translation, and a function block 214 for performing a bad block managing operation.

Figure 4:
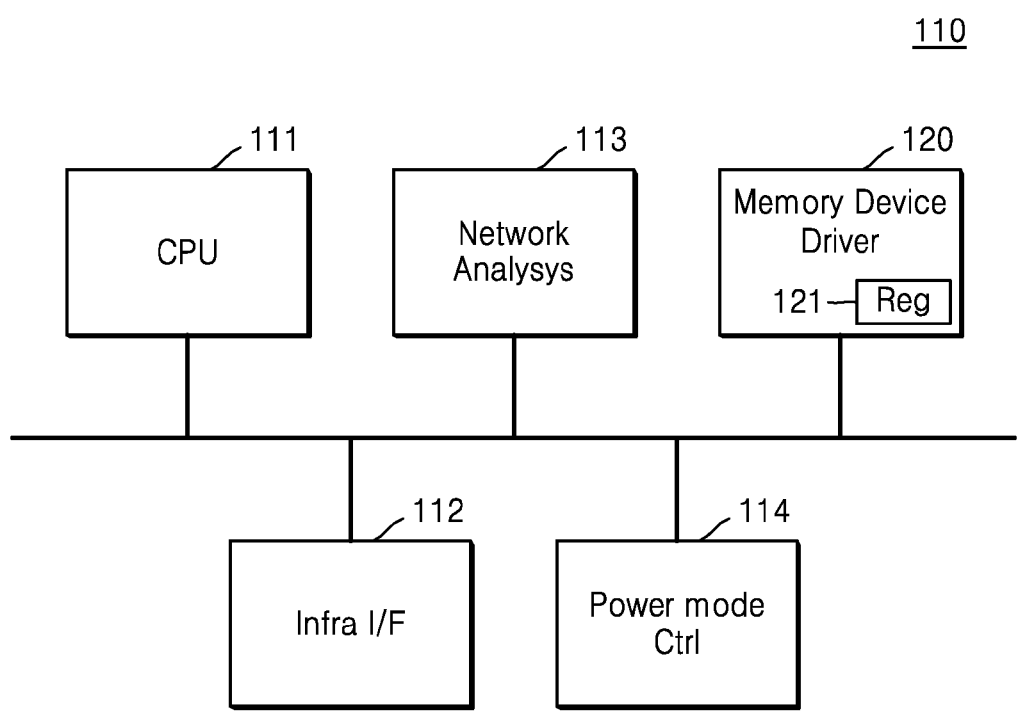
FIG. 4 is a block diagram of an application processor of FIG. 1 according to an embodiment of the inventive concept.

FIG. 4 is a block diagram of the application processor AP 110 of FIG. 1 according to an embodiment of the inventive concept.

As illustrated in FIG. 4, the application processor AP 110 may include a central processing unit (CPU) 111, an infra interface 112, a network analysis unit 113, a power mode control unit 114, and a memory device driver 120. Also, the memory device driver 120 may include a register set 121. The CPU 111 may manage all operations of the application processor AP 110 via a system BUS.

As described above, the infra interface 112 may be connected to various communication network environments. In addition, the infra interface 112 may include a connector so as to be connected to a USB environment or the like, and information about a surrounding infrastructure connected to the mobile apparatus 10 may be provided to the application processor AP 110 via the infra interface 112. When environment information about the connected surrounding infrastructure is recognized, the memory device driver 120 may set the register set 121 according to mode information that corresponds to the environment information.

When a system (e.g., a mobile system such as the mobile apparatus 10, etc.) operates according to the connected surrounding infrastructure, the network analysis unit 113 may calculate or determine an idle time in which an actual memory is not accessed, and during the pre-calculated idle time, the power mode control unit 114 may perform an operation for a power down of the host 100, and a managing operation for a power down of the non-volatile memory system 200. Also, the memory device driver 120 may control various memory managing operations including the garbage collection, the wear leveling, etc. of the non-volatile memory system 200. According to one embodiment, the memory device driver 120 may control the mobile apparatus 10 to perform memory managing operations according to different modes in view of the recognized environment information, by referring to the information about the surrounding infrastructure connected to the mobile apparatus 10.

Figure 5A:
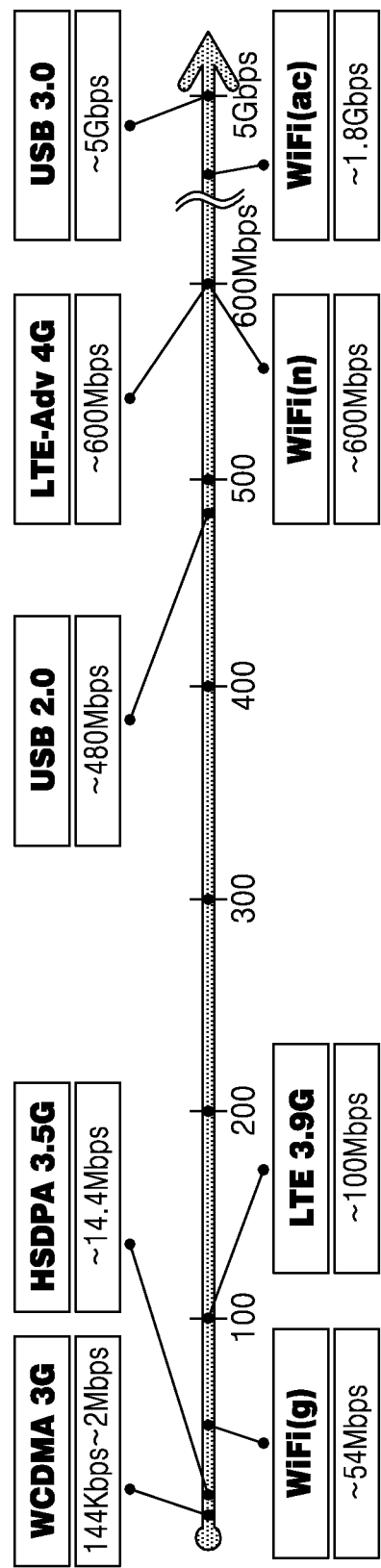
Figure 5B:
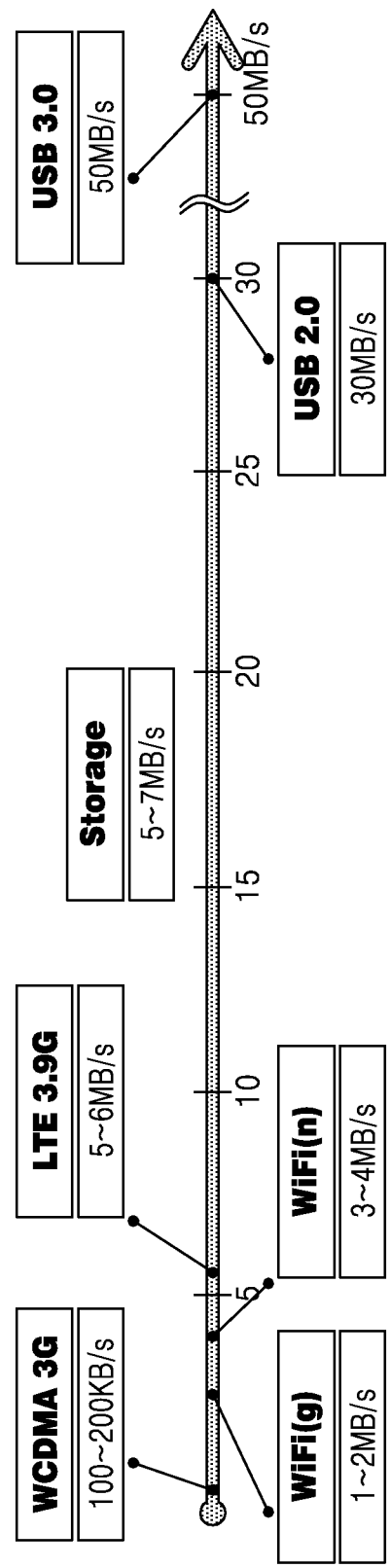

FIGS. 5A and 5B illustrate examples of a maximum bandwidth and a valid bandwidth of a surrounding infrastructure including a communication network, a USB, or the like.

A communication network that has developed to LTE-A, Wi-Fi, IEEE 802.11ac, or the like and is commercially used, and USB 3.0 used in a PC environment is now used in mobile apparatuses since various application processors support USB 3.0. Due to an increase of the bandwidth of the surrounding infrastructure connected to the mobile apparatus 10, a system bottleneck is decreased so that an actual idle time may be decreased. However, as shown in FIG. 5B, unlike bandwidths according to specifications of networks, actual valid bandwidths have low values due to various environment restrictions. The communication network is affected by a base station status, a frequency bandwidth, traffic, or the like and the speed deteriorates. Due to a characteristic of the mobile apparatus 10, a bottleneck such as FUSE, MTP, etc., may occur such that, although USB 3.0 is used, an actual speed is saturated at about 50 MB/s. Thus, when a network quality is lower than a bandwidth of the non-volatile memory system 200, the idle time is extended, and an internal managing operation may be performed to improve a performance of the non-volatile memory 201 during the idle time.

For example, the idle time of the memory system may indicate a period of time during which a memory access (e.g., read or write) is not actually performed. Accordingly, when the communication speed of the network is fast, an access frequency of the memory system increases, and the idle time that corresponds to a period of time between memory accesses is reduced. On the contrary, when the communication speed of the network is slow, an access frequency of the memory system is reduced, and thus a next memory access may be performed after a long idle time after a previous memory operation ends. Accordingly, when performance of a network environment is high, a relatively low level of internal memory management operations may be performed (e.g., if the idle time is short, only a relatively small number of free blocks can be obtained for a garbage collection operation), whereas when the performance of the network environment is low, a relatively high level of internal memory management operations may be performed (e.g., if the idle time is long, a relatively larger number of free blocks can be obtained for a garbage collection operation).

Figure 6:
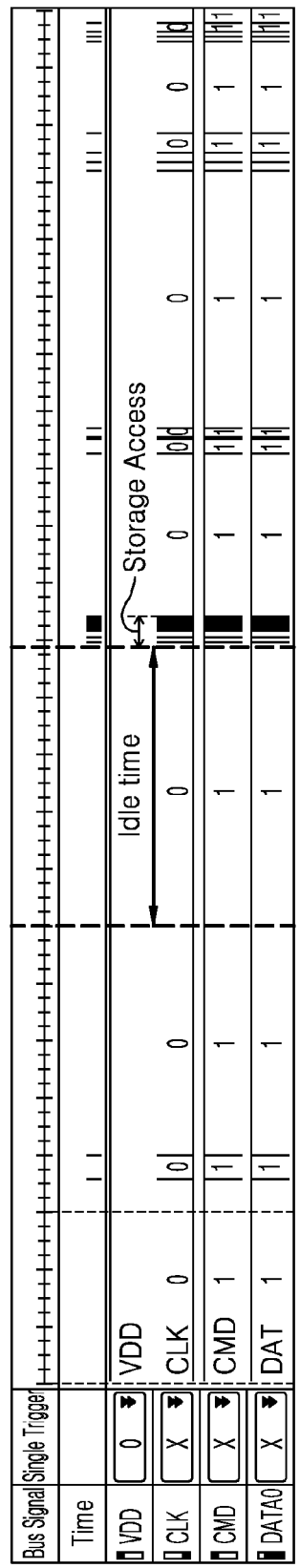
FIG. 6 illustrates an example of an idle time according to an operation of the non-volatile memory system.

FIG. 6 illustrates an example of an idle time according to an operation of the non-volatile memory system 200.

In terms of the non-volatile memory system 200, the idle time may be defined as times during which a memory I/F is not accessed by a host, or times during which memory cells of a memory (e.g., a non-volatile memory) are not being accessed. For example, idle time may occur between the end of a read or write operation, and the beginning of a subsequent read or write operation. During the idle time, an application processor may perform an operation such as an encoding operation, a decoding operation, or a display operation in which the application processor does not directly access the non-volatile memory system 200, or the idle time may be time in terms of the application processor. Since the application processor may perform an adjustment by lowering a frequency, in consideration of a workload or the number of tasks to be performed, the idle time may be further extended, in terms of the non-volatile memory system 200. As illustrated in FIG. 6, because the idle time is longer than an access time of the non-volatile memory system 200, it is convenient to perform a memory managing operation so as to improve a performance of the non-volatile memory system 200 during the idle time.

Figures 7A, 7B:
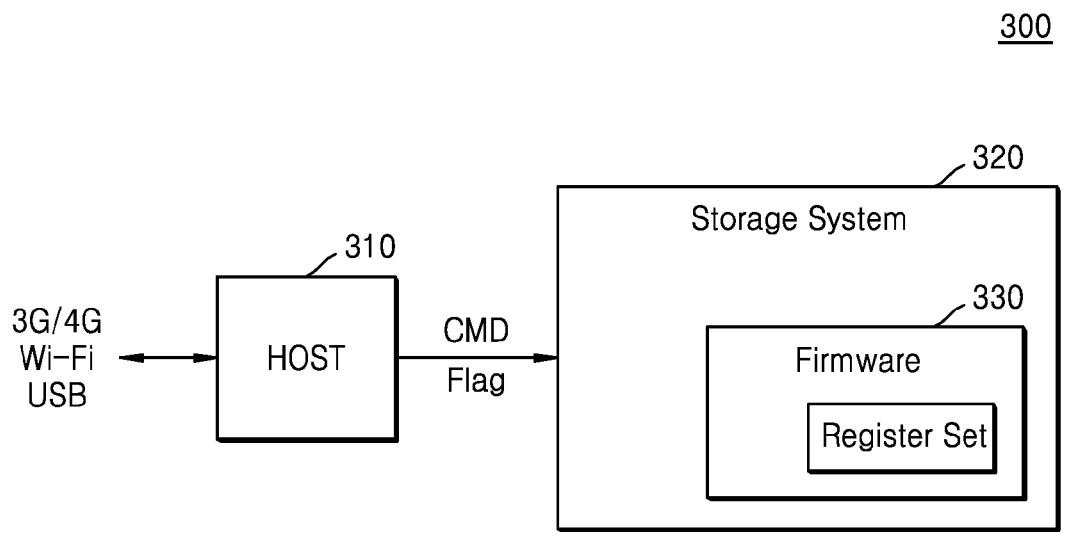
FIGS. 7A and 7B respectively are a block diagram and a table of an example in which information according to a surrounding infrastructure is set, according to an embodiment of the inventive concept.

FIGS. 7A and 7B respectively are a block diagram and a table of an example in which information according to a surrounding infrastructure is set, according to an embodiment of the inventive concept.

As illustrated in FIG. 7A, a mobile apparatus 300 may include a host 310 including an application processor (not shown), and a non-volatile memory system 320 as a storage system. Also, the non-volatile memory system 320 may include a memory controller (not shown) and a non-volatile memory device (not shown), and firmware 330 may be included in the memory controller. The firmware 330 may include a register set.

When the mobile apparatus 300 is connected to a communication network such as 3G, 4G, Wi-Fi, etc., or USB, environment information thereof may be recognized by the host 310 in the mobile apparatus 300. The host 310 may provide, to the non-volatile memory system 320, a flag Flag that corresponds to the recognized environment information, and may provide, to the non-volatile memory system 320, a command CMD for controlling mode information, which corresponds to the flag Flag, to be stored in the register set.

In addition, whenever a surrounding infrastructure connected with the mobile apparatus 300 is changed, the host 310 may provide, to the non-volatile memory system 320, a command CMD and a flag Flag that correspond to the changed environment information. As described above, a register set may also be included in the host 310, and mode information that corresponds to the recognized environment information may be stored in the register set of the host 310. Accordingly, during an idle time of the mobile apparatus 300, the mobile apparatus 300 may operate in a power down mode or a sleep mode in response to a control by the host 310, so that power consumption of the mobile apparatus 300 may be reduced. Also, when a memory managing operation is performed on the non-volatile memory system 320, the host 310 provides a command to the non-volatile memory system 320, based on the mode information set in the register set, so that managing operations, including garbage collection, wear leveling, or the like, may be performed. Alternatively, the non-volatile memory system 320 may itself perform the managing operations, including garbage collection, wear leveling, or the like, according to different modes, based on information that is set in the register set of the firmware 330 in the non-volatile memory system 320.

FIG. 7B illustrates an example in which mode information is selected according to recognized environment information. A flag Flag having different values according to a surrounding infrastructure recognized by the host 310 may be provided to the non-volatile memory system 320. In correspondence with the recognized surrounding infrastructure, the host 310 may select first mode information PD (e.g., power management operation mode information) for a power down in a register set (not shown) included in the host 310, and may select second mode information GC (e.g., memory management operation mode information, such as garbage collection mode information) for controlling the memory managing operation of the non-volatile memory system 320 in the register set.

The host 310 may provide, to the non-volatile memory system 320, the command CMD and the flag Flag so as to set the register set of the non-volatile memory system 320. Then, the firmware 330 of the non-volatile memory system 320 may set values related to the first mode information PD and the set second mode information GC in the register set, according to the flag Flag. For example, if the flag Flag has a small value, this may indicate connection to an infrastructure with a small bandwidth, and on the other hand, if the flag Flag has a large value, this may indicate connection to an infrastructure with a large bandwidth. According to the value of the flag Flag, a value that is set in the register set may vary between a 0 mode through an n mode. For example, if the flag Flag has a value of 1, the first mode information PD for the power down may be set to have a value of a first level Lev_pd1, and the second mode information GC for controlling the memory managing operation may be set to have a value of a first level Lev_gc1. Therefore, based on a flag that corresponds to a particular network environment (e.g., large vs. small bandwidth), a different mode may be selected for different types of settings. For example, for a particular flag indicating a particular network environment, a specific power-related mode (e.g., power-down, normal power, etc.) may be selected in certain cases, and a specific memory management mode (e.g., a specific number of blocks to free up during a garbage collection operation) may be selected in certain cases.

Figure 8:
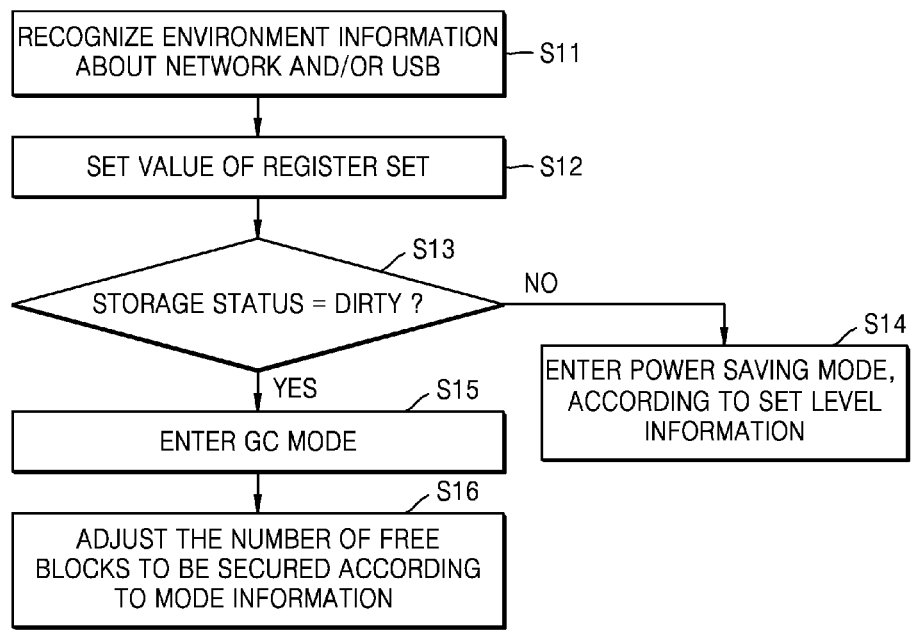
FIG. 8 is a flowchart of a method of operating a host and a non-volatile memory system, according to an embodiment of the inventive concept.

FIG. 8 is a flowchart of a method of operating a host and a non-volatile memory system, according to an embodiment of the inventive concept.

Upon a mobile apparatus being connected to a surrounding infrastructure, an application processor of the host recognizes environment information about a network and/or a USB (operation S11), and a value of a register set is set according to the recognized environment information (operation S12). The register set may be included, for example, in the host or in the non-volatile memory system. According to each communication speed of the recognized surrounding infrastructure, information for a power related-mode of the non-volatile memory system may be set according to different power management operation modes. In order to perform the setting, information (that may correspond to metadata), which has data related to each mode to be set in the register set according to a type of the surrounding infrastructure, may be pre-stored in the non-volatile memory system in the mobile apparatus. For example, in an early stage of an operation by the mobile apparatus, information that is stored in a memory device of the non-volatile memory system may be provided to the host, and mode information may be set in the register set, based on the pre-stored information and the recognized environment information.

An application processor may control a memory managing operation of the non-volatile memory system according to a set value of the register set. For example, the application processor may check a status of the non-volatile memory system, may determine a current amount of data written to a non-volatile memory device, and a degree of fragmentation, and thus may determine whether the non-volatile memory system is in a clean status or a dirty status (operation S13).

A basis for determining the dirty status may be variously set. For example, a degree of the dirty status may be determined with respect to a point when a performance of the non-volatile memory system deteriorates, compared to an initial performance. Alternatively, the host may check a current performance of the non-volatile memory system via a bus test.

If the non-volatile memory system is determined to be in the clean status, it may not be necessary to perform a memory managing operation such as garbage collection, wear leveling, or the like on the non-volatile memory system. In this case, the application processor may control a power saving mode to be performed according to level information that is set in the register set (operation S14). For example, the application processor may control the power saving mode to be performed, according to the level information that is set for each of a communication network and a USB environment. For example, by providing a sleep command to the non-volatile memory system, power consumption by the non-volatile memory system may be reduced. Alternatively, the mobile apparatus may operate in a sleep mode in response to a control by the application processor.

As described above, during the power saving mode, the application processor may control the non-volatile memory system to enter a standby status or a deep sleep mode, according to the mode information set in the register set. For example, in the standby status, the host may provide a sleep command to the non-volatile memory system and reduce the power consumption in a software manner. During the deep sleep mode, power consumption may be further reduced by reducing or cutting the power supplied to the non-volatile memory system in a hardware manner. When an idle time is short, e.g., when a communication speed is fast, the non-volatile memory system may reduce power by using an auto power saving mode.

As a result of determining a status of the non-volatile memory system, if the non-volatile memory system is in the dirty status, the memory managing operation of the non-volatile memory system may be performed according to the mode information that is set in the register set. In the embodiment of FIG. 8, garbage collection may be performed according to different modes. If the non-volatile memory system is in the dirty status, the non-volatile memory system may enter a garbage collection mode (operation S15). The garbage collection operation may be performed according to different modes according to the mode information set in the register set, and for example, the number of free blocks to be secured may be adjusted in different manners (operation S16). For example, if a communication speed is faster, an idle time may be relatively short and thus, the non-volatile memory system may be controlled to secure free blocks at a low speed (for example, to secure a small number of free blocks during each garbage collection operation). If the communication speed is slower (and an idle time is relatively long), the non-volatile memory system may be controlled to secure a larger number of free blocks during each garbage collection operation.

According to the present embodiment, it is possible to detect a performance of a non-volatile memory system embedded in a mobile apparatus, and since an actual speed of a communication medium such as a network or a USB is known, an available time for the non-volatile memory system to perform garbage collection may be pre-calculated and thus information for controlling the garbage collection may be set to cause different garbage collection states to be used. Here, mode information defined according to levels of communication speeds may be set in a register set of the non-volatile memory system, and when a surrounding infrastructure is changed, the mode information set in the register set may also be changed. In correspondence with the recognized surrounding infrastructure, the non-volatile memory system may control a level of the garbage collection to be adjusted by firmware according to the mode information set in the register set. Also, it is possible to control a time taken in performing a garbage collection operation to not exceed an idle time, and thus, an operation of a host may not be disturbed. For example, when a next command is input from the host while the garbage collection is being performed, the non-volatile memory system may cease performing the garbage collection, and may primarily process the input command.

Figure 9:
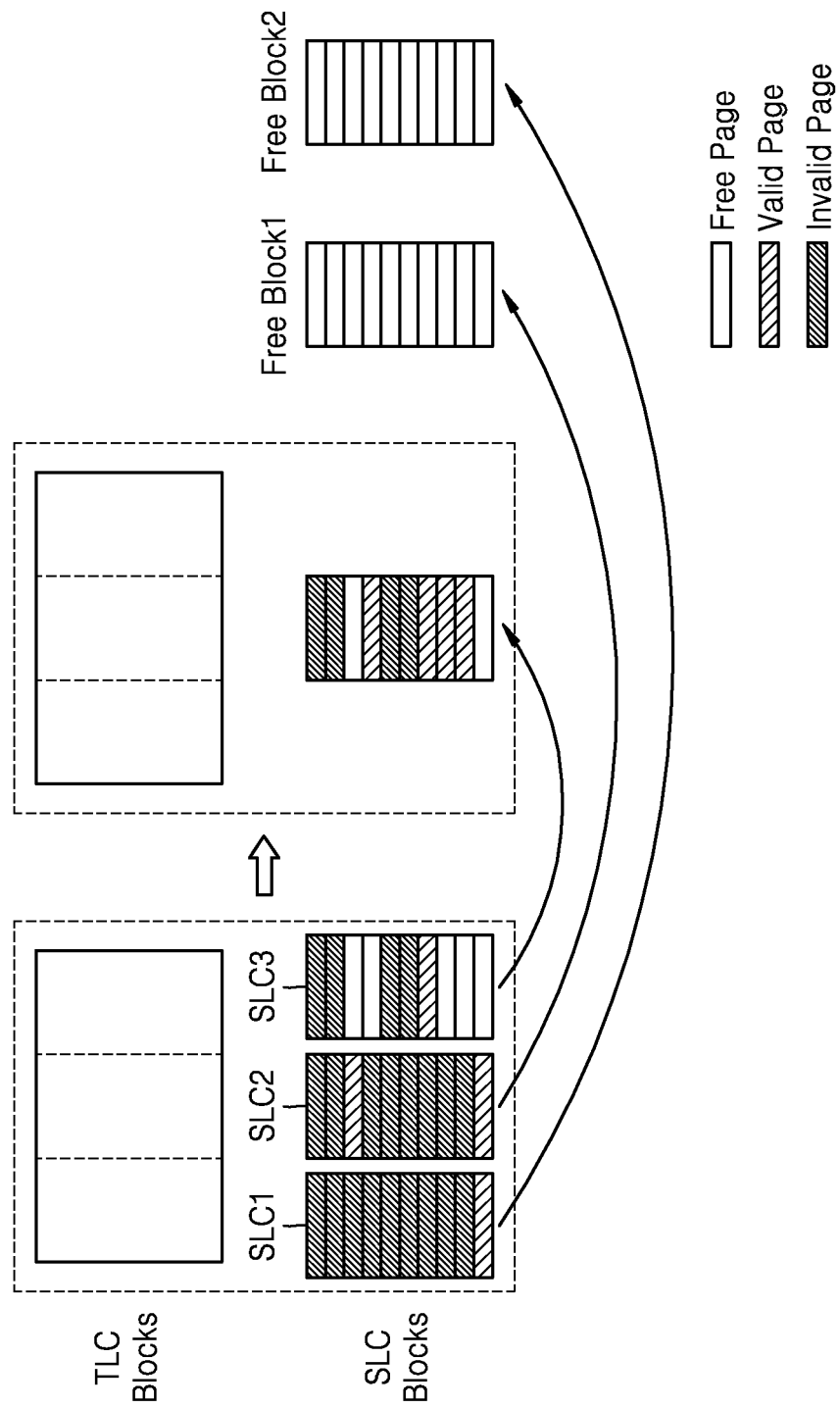
FIG. 9 illustrates garbage collection according to embodiments of the inventive concept.

FIG. 9 illustrates garbage collection according to embodiments of the inventive concept. Referring to FIG. 9, one or more three level cell ("TLC") blocks and single level cell ("SLC") blocks are arranged in one data storage unit that is recognized by a host. Although TLC and SLC blocks are shown as examples, other types of blocks (e.g., multi level cell ("MLC") blocks, or other combinations of these block types may be used. In one example, one free block is generated according to a selected mode for the garbage collection. In another example, two free blocks are generated according to another selected mode for the garbage collection. The type of process used in garbage collection may also be described herein as a garbage collection scheme. As such, under one exemplary garbage collection scheme, a first number of free blocks are generated for each garbage collection operation, and under a different exemplary garbage collection scheme, a different, second number of free blocks are generated for each garbage collection operation.

A piece of valid data stored in one or more SLC blocks may be copied to another SLC block. The SLC block that receives the valid data from the one or more SLC blocks stores the valid data. The receiving SLC block may include at least one free page or a free block that includes only one free page.

As illustrated in FIG. 9, a first SLC block SLC1 includes one valid page, a second SLC block SLC2 includes two valid pages, and a third SLC block SLC3 includes one valid page and five free pages. A memory controller (not shown) may copy valid data stored in the one valid page of the first SLC block SLC1 and valid data stored in the two valid pages of the second SLC block SLC2 to free pages of the third SLC block SLC3. As a result, the third SLC block SLC3 may include a total of four valid pages and two free pages. The first SLC block SLC1 and the second SLC block SLC2 may become free blocks Free Block 1 and 2 via an erase operation. In order for the memory controller to generate a free block, the memory controller may perform a memory managing operation so as to cause a certain number of free blocks (e.g., one free block, two free blocks, etc.) to be generated according to garbage collection mode information stored in a register set.

Figure 10:
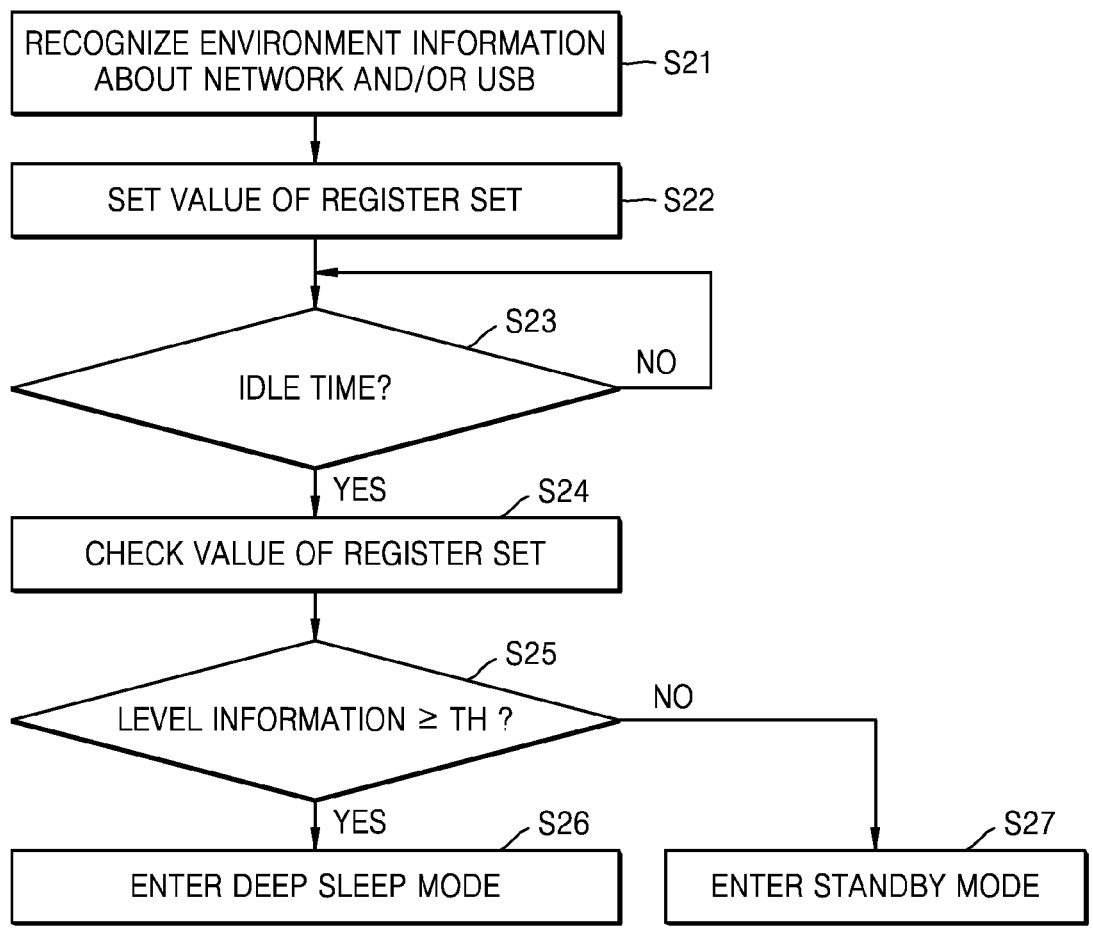
FIG. 10 is a flowchart of a method of operating a host and a non-volatile memory system, according to another embodiment of the inventive concept.

FIG. 10 is a flowchart of a method of operating a host and a non-volatile memory system, according to another embodiment of the inventive concept.

When a mobile apparatus is connected to a surrounding infrastructure, an application processor of the host recognizes environment information about a communication medium, such as a network and/or a USB (operation S21), and a value of a register set is set according to the recognized environment information (operation S22). Since information about a performance of the non-volatile memory system embedded in the mobile apparatus, and information about an actual speed of a network or a USB may be previously obtained, an application processor of the mobile apparatus may pre-calculate an idle time during a system operational period.

Accordingly, whether the mobile apparatus enters the idle time during the system operational period may be determined (operation S23). If it is not the idle time, the mobile apparatus performs a normal operation. However, if it is the idle time, a host or the non-volatile memory system may operate in a power saving mode or a memory managing mode for improving a memory performance, which corresponds to the idle time.

The embodiment of FIG. 10 is described with respect to an operation of the host. Referring to FIG. 10, a power managing mode is performed by assuming that the non-volatile memory system is in a clean status when the idle time starts. However, regardless of the current embodiment, the non-volatile memory system may itself perform a memory managing operation.

The host may check a value of mode information that is set in a register set arranged in the host (operation S24). A determination may be made as to whether the checked value of the mode information is equal to or greater than a predetermined threshold value (operation S25). For example, a specific value may be attributed to respective mode information. For example, during the idle time, the host may control the mobile apparatus to operate in the power saving mode, and may adjust a power saving degree according to the mode information in the register set. For example, if the checked value of the mode information is equal to or greater than the predetermined threshold value, the host may control the mobile apparatus to operate in a deep sleep mode (operation S26). In this case, the host may perform a power managing operation and may control the power supplied to various function blocks in the mobile apparatus. The power supply may be reduced or blocked.

Alternatively, if the checked value of the mode information is less than the predetermined threshold value, the host may control the mobile apparatus to operate in a standby mode (operation S27). In this case, the host may provide a command to the various function blocks in the mobile apparatus and may control a power save mode to be performed in a software manner. The non-volatile memory system may control an internal operation in response to the command indicating a start of the standby mode from the host and may reduce power consumption. Thus, different values may be given to different power management operation modes, according to the amount of power saved in the different modes.

Figure 11:
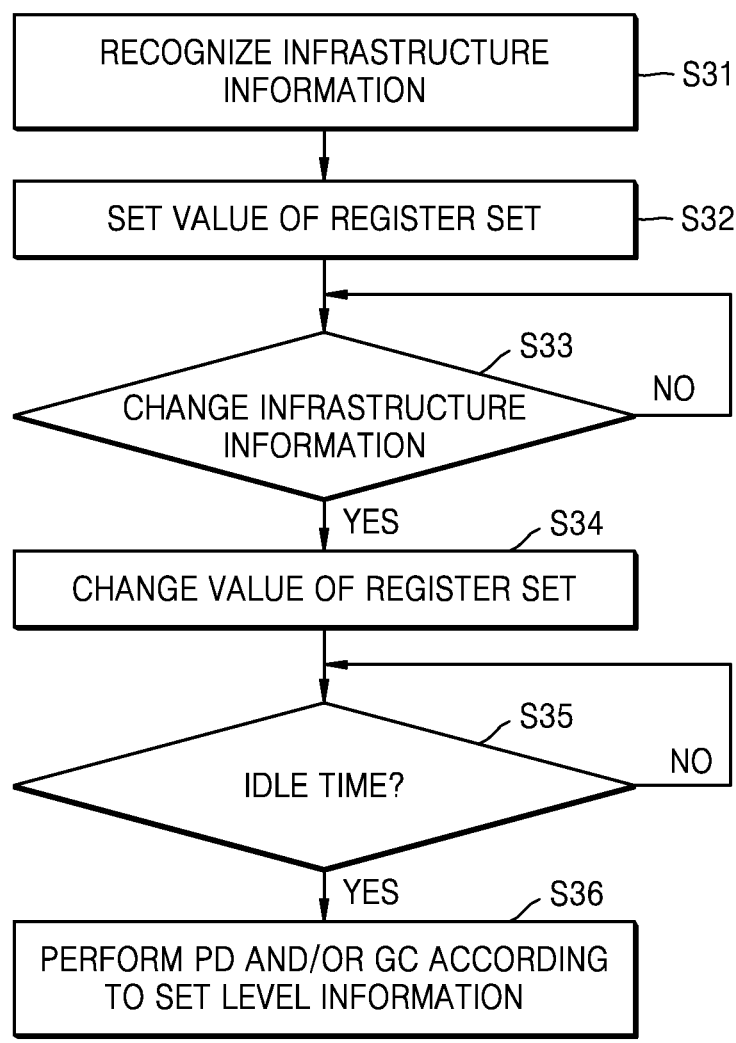
FIG. 11 is a flowchart of a method of operating a host and a non-volatile memory system, according to another embodiment of the inventive concept.

FIG. 11 is a flowchart of a method of operating a host and a non-volatile memory system, according to another embodiment of the inventive concept. In the embodiment of FIG. 11, mode information is set in register sets in the host and the non-volatile memory system, respectively.

An application processor of a mobile apparatus may recognize infrastructure information (operation S31), and may set a value of the register set in the host to correspond to certain modes, according to the recognized infrastructure information (or recognized environment information) (operation S32). Also, the application processor may provide, to the non-volatile memory system, a flag that corresponds to the recognized infrastructure information, and a memory controller in the non-volatile memory system may set information of a register set arranged in the memory controller to correspond to a particular mode, according to a value of the flag.

Since a surrounding environment of the mobile apparatus may be changed, the application processor detects whether the infrastructure information about a surrounding infrastructure connected with the mobile apparatus is changed (operation S33). According to a result of the detection, setting of the value of the register set in the host may be changed (operation S34). In addition, a flag that corresponds to the changed infrastructure information may be provided to the non-volatile memory system, and thus a value of the register set in the memory controller in the non-volatile memory system may also be changed.

The application processor may constantly (or continually) determine whether to enter an idle time, based on pre-calculated information about an idle time (operation S35). If it is determined to enter the idle time, the application processor may perform a power saving mode (or a power down mode) according to a level of information set in the register set, and/or may control the non-volatile memory system to perform a memory managing operation such as garbage collection or the like (operation S36).

Figure 12:
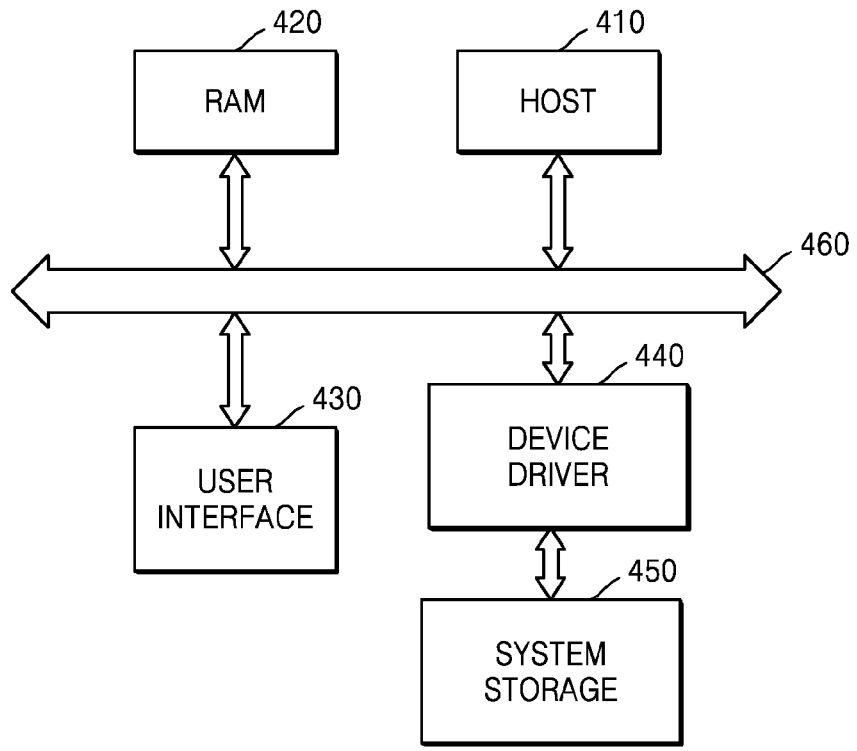
FIG. 12 is a block diagram of a computing system including a non-volatile memory system according to an embodiment of the inventive concept.

FIG. 12 is a block diagram of a computing system 400 including a non-volatile memory system according to an embodiment of the inventive concept. In the computing system 400 such as a mobile apparatus or a desk top computer, the non-volatile memory system according to the one or more embodiments of the inventive concept may be embodied as a non-volatile storage system 450.

In the present embodiment, the computing system 400 may include a host 410 including a CPU, etc., RAM 420, a user interface 430, and a device driver 440. Each of the aforementioned elements is electrically connected to a bus 460. The non-volatile storage system 450 may be connected to the device driver 440. The host 410 may control the computing system 400 and may perform a calculation that corresponds to a user input via the user interface 430. The RAM 420 may function as a data memory of the host 410, and the host 410 may write or read user data to or from the non-volatile storage system 450 via the device driver 440. In the embodiment of FIG. 12, the device driver 440 for controlling an operation and management of the non-volatile storage system 450 is arranged outside the host 410. However, as in the aforementioned embodiments, the device driver 440 may be arranged in the host 410.

As in the aforementioned embodiments, when the computing system 400 is connected to a surrounding infrastructure, the host 410 recognizes the connection, and controls setting of information of a register set, based on recognized environment information. In addition, when a flag that corresponds to the recognized surrounding infrastructure is provided to the device driver 440, the device driver 440 controls the non-volatile storage system 450 to set mode information in a register set arranged in the non-volatile storage system 450. Accordingly, when the computing system 400 enters an idle time, a power saving mode may be performed or a memory managing operation may be performed according to different garbage collection modes, as in the aforementioned embodiments.

Figure 13:
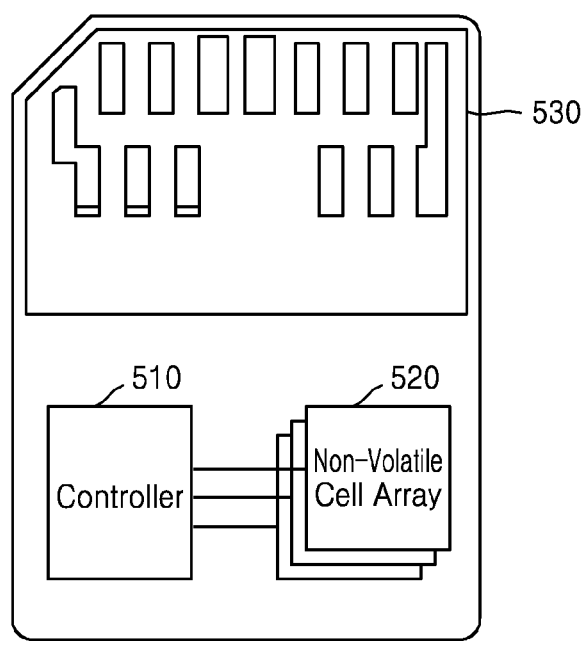
FIG. 13 illustrates a memory card according to an embodiment of the inventive concept.

FIG. 13 illustrates a memory card 500 according to an embodiment of the inventive concept. The memory card 500 may function as a portable storage device that is usable by being connected to an electronic apparatus such as a mobile apparatus or a desk top computer. As illustrated in FIG. 13, the memory card 500 may include a controller 510, a non-volatile cell array 520, and a port area 530.

The memory card 500 may communicate with an external host (not shown) via the port area 530, and the controller 510 may control the non-volatile cell array 520. The controller 510 may perform an operation by reading a program from ROM (not shown) that stores the program. The memory managing operation of the non-volatile memory system according to the one or more embodiments of the inventive concept may be performed by the controller 510. The non-volatile cell array 520 may include a cell array such as a NAND flash memory, a NOR flash memory, etc.

Also, as in the aforementioned embodiments, the memory card 500 receives information (i.e., a flag) related to a surrounding infrastructure from the host via the port area 530, and the controller 510 sets mode information in a register set in the controller 510, according to the flag. The memory card 500 may receive information corresponding to an idle time from the host and may perform a memory managing operation such as garbage collection and/or wear leveling according to the mode information set in the register set in the controller 510.

Figure 14:
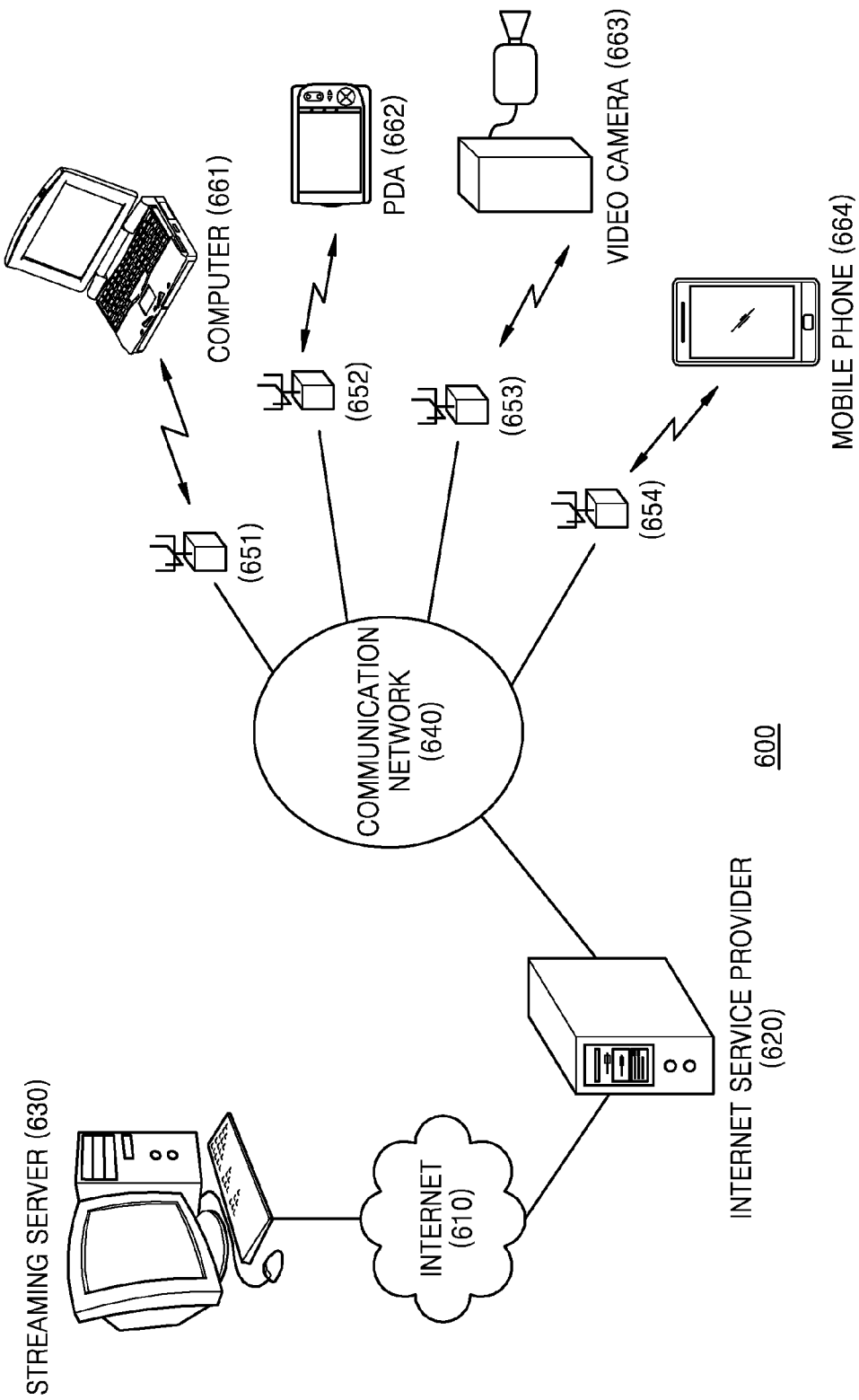
FIG. 14 illustrates an entire configuration of a contents transmitting and receiving system that transmits and receives a plurality of contents of devices via a communication network.

FIG. 14 illustrates a content transmitting and receiving system 600 that transmits and receives content of a plurality of devices via a communication network. A service area of a communication system is divided into cells having a predetermined size, and wireless base stations 651 through 654 may be installed in the cells, respectively.

The content transmitting and receiving system 600 may include a plurality of devices, including mobile device and non-mobile devices. For example, independent devices such as a computer 661, a Personal Digital Assistant (PDA) 662, a video camera 663, a mobile phone 664, or the like are connected to the Internet 610 via an internet service provider 620, a communication network 640, and the wireless base stations 651 through 654. However, the content transmitting and receiving system 600 is not limited to the configuration shown in FIG. 14, and the devices may be selectively connected. The devices may be directly connected to the communication network 640 without using the wireless base stations 651 through 654. The video camera 663 is an image capturing device such as a digital video camera capable of capturing a video. The mobile phone 664 may select at least one communication scheme from among various protocols including Personal Digital Communications (PDC), code division multiple access (CDMA), wideband code division multiple access (W-CDMA), Global System for Mobile Communications (GSM), and Personal Handyphone System (PHS).

The host and the non-volatile memory system according to the one or more embodiments of the inventive concept may be arranged in each of the devices. For example, each of the computer 661, the PDA 662, the video camera 663, and the mobile phone 664 may have the host including a processor for controlling a corresponding device, and may have the non-volatile memory system for storing various types of information for each of the devices in a non-volatile manner. The non-volatile memory system may be configured to separately include a memory controller and a flash memory device, or may be configured in a manner such that an independent memory card is embedded in the corresponding device.

The host and the non-volatile memory system arranged in each of the devices may perform operations described in the aforementioned embodiments. For example, the devices such as the computer 661, the PDA 662, the video camera 663, and the mobile phone 664 may be connected to the communication network 640 in a direct manner or via the wireless base stations 651 through 654. The non-volatile memory system arranged in each of the devices may receive information (i.e., a flag) related to a surrounding infrastructure from the host in the corresponding device, and may perform a memory managing operation such as garbage collection and/or wear leveling according to mode information set in a register set in the memory controller.

Figure 15:
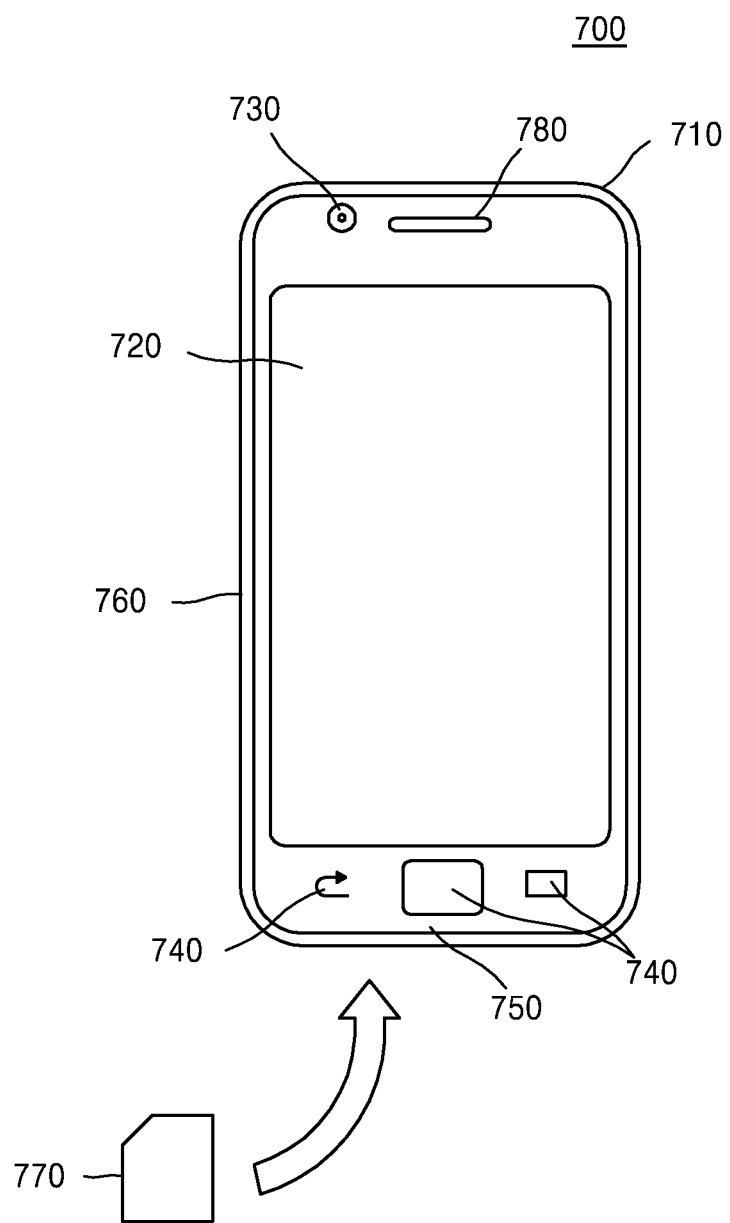
FIG. 15 is a diagram of a mobile terminal having a host and a non-volatile memory system embodied therein, according to an embodiment of the inventive concept.

FIG. 15 is a diagram of a mobile terminal 700 having a host and a non-volatile memory system embodied therein, according to an embodiment of the inventive concept. The mobile terminal 700 of FIG. 15 may correspond to the mobile phone 664 shown in FIG. 14, and an application processor as in the aforementioned embodiments may be embodied in the mobile terminal 700. The mobile terminal 700 may be, for example, a smart phone that has functions that are not limited and can change or be extended by using an application program. The mobile terminal 700 includes an embedded antenna 710 for exchanging a radio frequency (RF) signal with a wireless base station, and also includes a display screen 720 such as a liquid crystal display (LCD) screen, an organic light-emitting diode (OLED) screen, etc. for displaying images that are captured by a camera 730 or images that are received by the antenna 710 and then are decoded. The mobile terminal 700 may include an operation panel 740 including a control button and a touch panel. If the display screen 720 is a touch screen, the operation panel 740 may further include a touch panel of the display screen 720. The mobile terminal 700 includes a speaker 780 or a sound output unit for outputting a voice and sound, and a microphone 750 or a sound input unit for receiving a voice and sound. The mobile terminal 700 further includes a camera 730 such as a charge coupled device (CCD) camera for capturing a video and a still image. Also, the mobile terminal 700 may include a storage medium 770 for storing encoded or decoded data such as a video or still images that are captured by the camera 730, received via an e-mail, or obtained in another way, and a slot for mounting the storage medium 770 into the mobile terminal 700. The storage medium 770 may be a non-volatile memory system as in the aforementioned embodiments, and may be a flash memory such as an SD card or an electrically erasable and programmable read only memory (EEPROM) embedded in a plastic case.

While the inventive concept has been particularly shown and described with reference to exemplary embodiments thereof, it will be understood that various changes in form and details may be made therein without departing from the spirit and scope of the following claims.

What is claimed is:

1. A method of controlling a non-volatile memory system including a non-volatile memory device having a non-volatile memory cell array, the method comprising:
   determining environment information including a communication speed relating to a communication network connected externally to a system in which the non-volatile memory system and a host connected to each other are implemented;
   selecting a management operation mode based on the determined environment information; and
   performing a memory managing operation on the non-volatile memory device using the selected management operation mode during an idle time of the non-volatile memory device,
   wherein the idle time of the non-volatile memory device varies according to the type of the communication network.

2. The method of claim 1, wherein the memory managing operation comprises a garbage collection operation for generating a free block.

3. The method of claim 1, wherein the environment information corresponds to the communication speed of the communication network.

4. The method of claim 1, further comprising:
   selecting the management operation mode based on mode information indicating the management operation mode; wherein
   the memory managing operation comprises a garbage collection operation for generating one or more free blocks, and
   a number of free blocks to be secured by the garbage collection operation during the idle time is determined based on the mode information.

5. The method of claim 1, wherein:
   the mode information is stored in a register set, and
   a power saving mode of the non-volatile memory system is controlled according to the mode information.

6. The method of claim 5, wherein the system is a mobile apparatus and wherein when the network to which the mobile apparatus is connected is changed, the mode information that is set in the register set is changed to correspond to environment information corresponding to the changed communication network.

7. The method of claim 1, further comprising:
   determining whether the non-volatile memory device includes a dirty status;
   when the non-volatile memory device includes a dirty status, performing garbage collection during idle time of the non-volatile memory device, the garbage collection being performed using the selected management operation mode; and
   when the non-volatile memory device does not include a dirty status, performing a power management operation during idle time of the non-volatile memory device, the power management operation selected using the selected management operation mode.

8. The method of claim 1, wherein the system is a mobile apparatus, and wherein the determining, selecting, and performing, are all carried out by the mobile apparatus that includes the non-volatile memory system.

9. The method of claim 1, wherein the management operation mode is one of memory management operation mode and a power management operation mode.

10. A method of operating a non-volatile memory system, the method comprising:
receiving environment information related to a surrounding infrastructure of a communication network connected externally to a mobile apparatus comprising the non-volatile memory system and a host device connected to each other;
setting mode information in a register set, based on the environment information; and
during an idle time of the non-volatile memory system, performing a memory managing operation on a non-volatile memory device included in the non-volatile memory system according to the mode information set in the register set,
wherein the idle time of the non-volatile memory device varies with a type of the surrounding infrastructure.

11. The method of claim 10, wherein the memory managing operation comprises:
a garbage collection operation for generating one or more free blocks, wherein a number of free blocks to be secured by the garbage collection operation during the idle time is set according to the mode information.

12. The method of claim 11, wherein when the environment information causes the idle time to be over a threshold amount, the number of free blocks to be secured by the garbage collection operation during the idle time is set to a first amount, and when the environment information causes the idle time to be under the threshold amount, the number of free blocks to be secured by the garbage collection operation during the idle time is set to a second amount smaller than the first amount.

13. The method of claim 10, further comprising changing the mode information that is set in the register set based on a change in the environment related to the surrounding infrastructure.

14. The method of claim 10, further comprising selectively performing at least one of a standby mode and a deep power down mode during the idle time based on the mode information.

15. The method of claim 10, further comprising:
determining whether the non-volatile memory system includes a dirty status;
when the non-volatile memory device includes a dirty status, performing garbage collection during idle time of the non-volatile memory device, the garbage collection being performed using a management operation mode selected based on the mode information; and
when the non-volatile memory device does not include a dirty status, performing a power management operation during idle time of the non-volatile memory device, the power management operation performed using a management operation mode selected based on the mode information.

16. The method of claim 10, wherein the receiving, determining, setting, and performing, are all carried out by the mobile apparatus.

17. A mobile terminal comprising:
a non-volatile memory system having a memory controller; and
a host connected internally to the non-volatile memory system and connected externally to a communication network, wherein the host communicates environment information of the communication network to the non-volatile memory system and the memory controller sets mode information based on the environment information and performs a memory managing operation during an idle time of the non-volatile memory system,
wherein a mode of the memory managing operation is selected based on the mode information.

18. The mobile terminal of claim 17, wherein the communication network is one of a 3G network, a 4G network, a Wi-Fi network and a local area network (LAN).

19. The mobile terminal of claim 17, wherein the memory managing operation includes a garbage collection operation.

20. The mobile terminal of claim 19, wherein the mode information includes a number of free blocks to be secured by the garbage collection operation during the idle time.

* * * * *